(12) United States Patent
Doherty

(10) Patent No.: US 6,683,290 B2
(45) Date of Patent: Jan. 27, 2004

(54) CONSTANT LIGHT DISABLE FOR SPATIAL LIGHT MODULATOR

(75) Inventor: Donald B. Doherty, Richardson, TX (US)

(73) Assignee: Texas Instruments Incorporated, Dallas, TX (US)

(*) Notice: Subject to any disclaimer, the term of this patent is extended or adjusted under 35 U.S.C. 154(b) by 36 days.

(21) Appl. No.: 10/033,332

(22) Filed: Dec. 28, 2001

(65) Prior Publication Data

US 2002/0121588 A1 Sep. 5, 2002

Related U.S. Application Data

(60) Provisional application No. 60/258,608, filed on Dec. 28, 2000.

(51) Int. Cl.[7] .................................................. G01J 1/20
(52) U.S. Cl. .............................. 250/201.1; 250/214 C; 359/239
(58) Field of Search ....................... 250/214 R, 214 C, 250/214 AG, 214 RC, 201.1; 327/514–515; 356/221–223, 226, 209; 359/239, 291, 292

(56) References Cited

U.S. PATENT DOCUMENTS

| | | |
|---|---|---|
| 5,061,049 A | 10/1991 | Hornbeck |
| 5,179,274 A | 1/1993 | Sampsell |
| 5,481,118 A | 1/1996 | Tew |
| 5,557,440 A * | 9/1996 | Hanson et al. .............. 359/161 |
| 5,583,688 A | 12/1996 | Hornbeck |
| 5,917,568 A * | 6/1999 | Johnson et al. ............. 349/116 |
| 6,476,954 B1 * | 11/2002 | Nishizono ................... 359/189 |
| 6,590,695 B1 * | 7/2003 | Kurtz et al. ................ 359/291 |

\* cited by examiner

Primary Examiner—David Porta
Assistant Examiner—Patrick J. Lee
(74) Attorney, Agent, or Firm—Charles A. Brill; Wade James Brady, III; Frederick J. Telecky, Jr.

(57) ABSTRACT

A method and system of detecting whether the intensity of light incident a spatial light modulator varies periodically. One embodiment provides a method of operating a spatial light modulator, the method comprising: determining a peak level of light incident the modulator over a period of time; setting a threshold level equal to a fraction of the peak level; monitoring a current level of light incident the modulator; comparing the current level of light and the threshold level; and disabling the modulator based on the comparison. Another embodiment provides a modulator array. The modulator comprises: a photosensitive circuit for outputting a light intensity signal representative of a level of light incident the photosensitive circuit; a threshold detection circuit 400 receiving the light intensity signal 402 and outputting an under threshold signal 408 indicative of whether the intensity signal is less than a threshold level; and a duty cycle detection circuit 410 for monitoring the under threshold signal 408 and outputting a disable signal 418 indicative of the duty cycle of the under threshold signal 408. The preceding abstract is submitted with the understanding that it only will be used to assist in determining, from a cursory inspection, the nature and gist of the technical disclosure as described in 37 C.F.R. §1.72(b). In no case should this abstract be used for interpreting the scope of any patent claims.

49 Claims, 3 Drawing Sheets

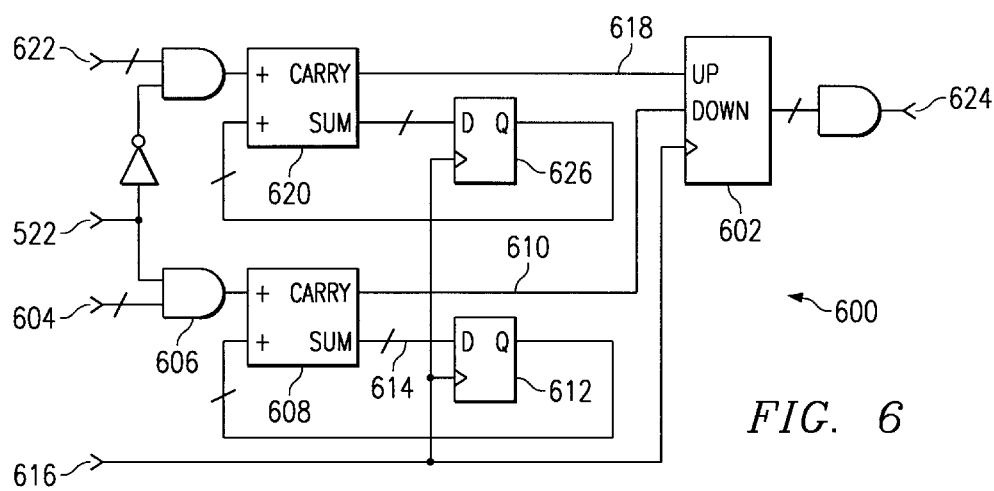
FIG. 6
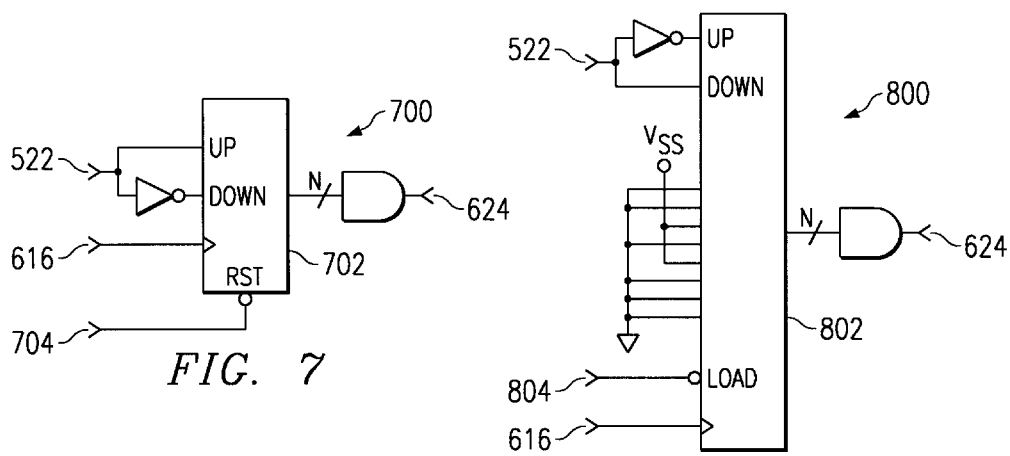
FIG. 7
FIG. 8
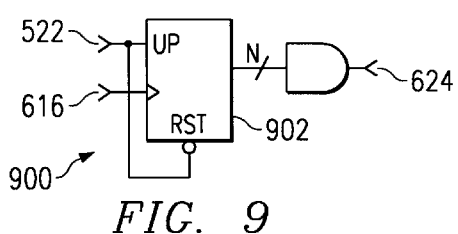
FIG. 9
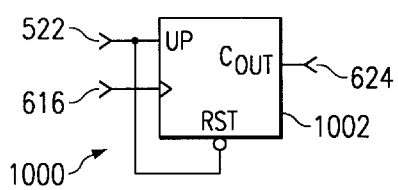
FIG. 10
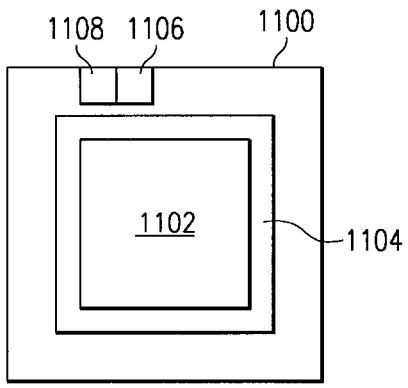
FIG. 11

CONSTANT LIGHT DISABLE FOR SPATIAL LIGHT MODULATOR

This application claims priority under 35 USC §119(e)(1) of provisional application No. 60/258,608 filed Dec. 28, 2000.

CROSS-REFERENCE TO RELATED APPLICATIONS

The following patents and/or commonly assigned patent applications are hereby incorporated herein by reference:

| Patent No. | Filing Date | Issue Date | Title |
| --- | --- | --- | --- |
| 5,061,049 | Sep. 13, 1990 | Oct. 29, 1991 | Spatial Light Modulator and Method |
| 5,583,688 | Dec. 21, 1993 | Dec. 10, 1996 | Multi-Level Digital Micromirror Device |
| 5,179,274 | Jul. 21, 1991 | Jan. 12, 1993 | Method For Controlling Operation Of Optical Systems And Devices |
| 5,481,118 | Jan. 25, 1995 | Jan. 2, 1996 | On-Chip Light Sensor |

FIELD OF THE INVENTION

This invention relates to the field of display systems, more particularly to display systems using spatial light modulators.

BACKGROUND OF THE INVENTION

Spatial light modulators such as micromirror arrays and liquid crystal on silicon panels are used in many modern display applications. These modulators have found application in displays ranging from ultraportable projectors weighing less than three pounds, to theater grade projectors capable of performance exceeding that of existing film technologies.

In spite of the greatly varying performance of the projectors, the modulator used in all of the applications is very similar. The commonality of the modulators is a boon to the manufacturing process, but can have negative unintended consequences when the modulators are pin for pin compatible. This is particularly true when the modulators are especially screened or selected for use with particular display system. For example, if a modulator has excellent uniformity across the modulator array, it may be selected for use in a cinema application in which image quality is the all important criteria. Modulators with lesser performance may fail this screen and be allocated to display systems with less strict image quality requirements.

If a display manufacturer or end user were to replace the modulator of a cinema grade projector with the modulator that failed the image screening tests required of a cinema grade projector, the performance of the display system would be degraded. This could damage the reputation of the display manufacturer as well as the manufacturer of the modulator and, depending on the intensity levels the modulator is exposed to, damage the modulator. Therefore, there is a need for the modulator manufacturer to control the use of the spatial light modulators in order to prevent the modulators from being used in projectors they are not designed for.

SUMMARY OF THE INVENTION

Objects and advantages will be obvious, and will in part appear hereinafter and will be accomplished by the present invention which provides a method and system for limiting the operation of a spatial light modulator to a particular class of display systems. One embodiment of the claimed invention provides a method of operating a spatial light modulator, the method comprising: determining a peak level of light incident the modulator over a period of time; setting a threshold level equal to a fraction of the peak level; monitoring a current level of light incident the modulator; comparing the current level of light and the threshold level; and disabling the modulator based on the comparison.

Another embodiment of the disclosed invention provides a modulator array. The modulator comprises: a photosensitive circuit for outputting a light intensity signal representative of a level of light incident the photosensitive circuit; a threshold detection circuit 400 receiving the light intensity signal 402 and outputting an under threshold signal 408 indicative of whether the intensity signal is less than a threshold level; and a duty cycle detection circuit 410 for monitoring the under threshold signal 408 and outputting a disable signal 418 indicative of the duty cycle of the under threshold signal 408.

BRIEF DESCRIPTION OF THE DRAWINGS

For a more complete understanding of the present invention, and the advantages thereof, reference is now made to the following descriptions taken in conjunction with the accompanying drawings, in which:

FIG. 6 is a schematic diagram of one embodiment of a duty cycle detect circuit of the constant light disable system of FIG. 4.

FIG. 7 is a schematic diagram of another embodiment of a duty cycle detect circuit of the constant light disable system of FIG. 4.

FIG. 8 is a schematic diagram of another embodiment of a duty cycle detect portion of the constant light disable system of FIG. 4.

FIG. 9 is a schematic diagram of another embodiment of a duty cycle detect circuit of the constant light disable system of FIG. 4.

FIG. 10 is a schematic diagram of another embodiment of a duty cycle detect portion of the constant light disable system of FIG. 4.

FIG. 11 is a plan view of a modulator array showing a light modulating region, a photosensitive circuit, a threshold detection circuit, and a duty cycle detection circuit according to one embodiment of the present invention.

DETAILED DESCRIPTION OF THE PREFERRED EMBODIMENTS

A new method and system has been developed that enables a spatial light modulator to determine whether it is in a sequential color or a parallel color display system.

Because the cinema quality display systems are parallel color systems, while many portable systems are sequential color systems, the light level over a frame period may be used to determine which type of system in which the modulator is installed. When a modulator designed for a parallel color system is installed in a sequential color system, or vice versa, the modulator can detect the incorrect light intensity and cease operation.

Figure 1:
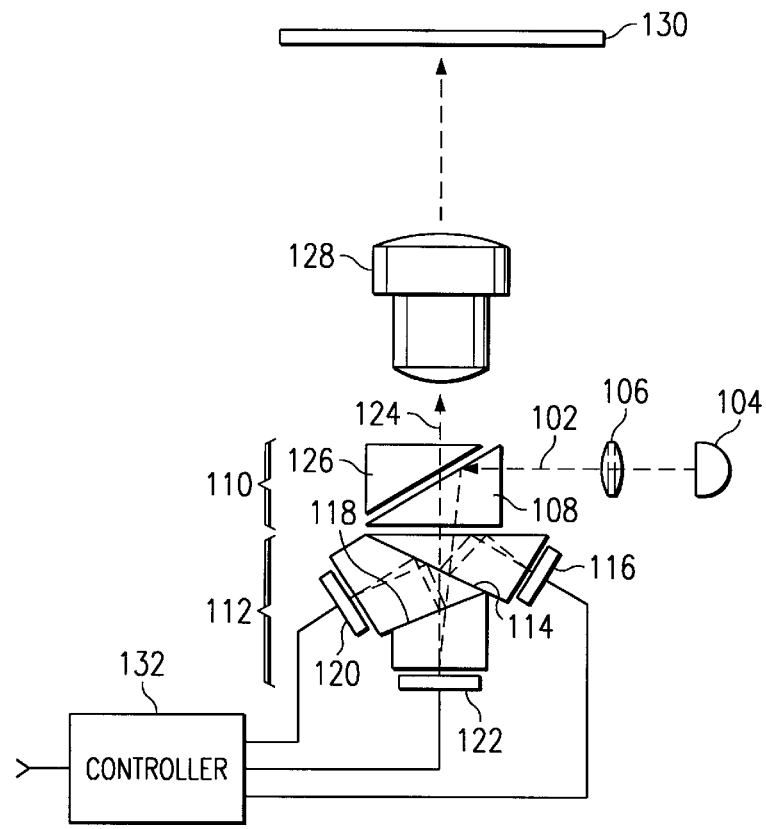
FIG. 1 is a schematic view of a three modulator display system.

FIG. 1 is a schematic view of a three modulator display system. In FIG. 1, a white light beam 102 from a light source 104 is collected and focused by the lamp reflector and a condenser optic 106. While shown as a single lens, the condenser optic 106 often is several lenses and may include integrating rods or other optical components.

The light beam 102 enters a first prism 108 in a total internal reflection (TIR) prism assembly 110 and is reflected at an interface between two of the prisms. The reflected light then enters a color splitting prism assembly 112. Dichroic filters at the interfaces between various prisms in the color splitting prism assembly 112 separate the white light beam into three primary color beams. Although described as primary color light beams, the light beams are not monochromatic, but rather are comprised of light over a band of wavelengths perceived as a primary color light beam. In FIG. 1, a dichroic filter on prism face 114 reflects red light to a first modulator 116. The remaining cyan light travels to a second dichroic filter on prism face 118 which reflects blue light to a second modulator 120. The remaining green light passes through both of the dichroic filters to reach a third modulator 122.

Each of the three modulators receives image data appropriate to the color received by that modulator and modulates the received primary colored light beam based on that image data received. Each of the modulated light beams retraces their path through the color splitting prism assembly 112, at a slightly different angle when a micromirror is used, and is recombined into a single full-color modulated light beam 124.

The full color modulated light beam enters the TIR prism assembly at an angle that causes the modulated light to pass through the interface between the prisms of the TIR prism assembly 110. The modulated light exits the correction prism 126 of the TIR prism assembly 110 and is focused by the projection lens 128 onto an image plane 130.

The intensity of the light striking each of the modulators 116, 122, 120 of FIG. 1 is dependent on the intensity of the particular primary color component being modulated. The light source 104 outputs light having a consistent intensity level and spectrum. The light striking each modulator typically is not equal, as common light sources do not have a constant output intensity across the visible spectrum. The individual modulators, therefore, each receive a primary colored light beam having a fairly constant, but unequal, intensity level.

Figure 2:
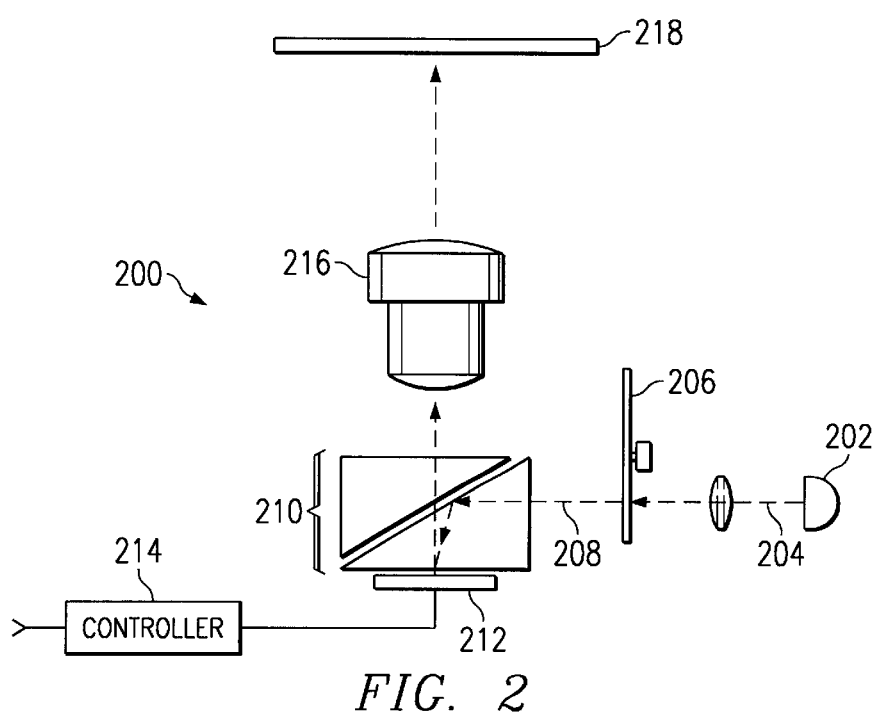
FIG. 2 is a schematic view of a one modulator display system.

FIG. 2 is a schematic view of a one modulator display system. Light source 202 produces a white light beam that is collected and focused onto a rotating color wheel 206. The color wheel 206 temporally separates the white light beam 204 into a series of primary color light beams 208. The sequential color light beam 208 enters a TIR prism assembly 210 and is reflected by an interface between the prisms. The reflected light is directed to the spatial light modulator 212 which modulates the light according to image data received from a controller 214. The controller synchronizes the image data with the color of light passing through the color wheel 206. The modulated light is focused by a projection lens 216 onto an image plane 218. The display system 200 sequentially creates three primary colored images which are integrated by the viewer's eye to produce a single full color image.

Figure 3:
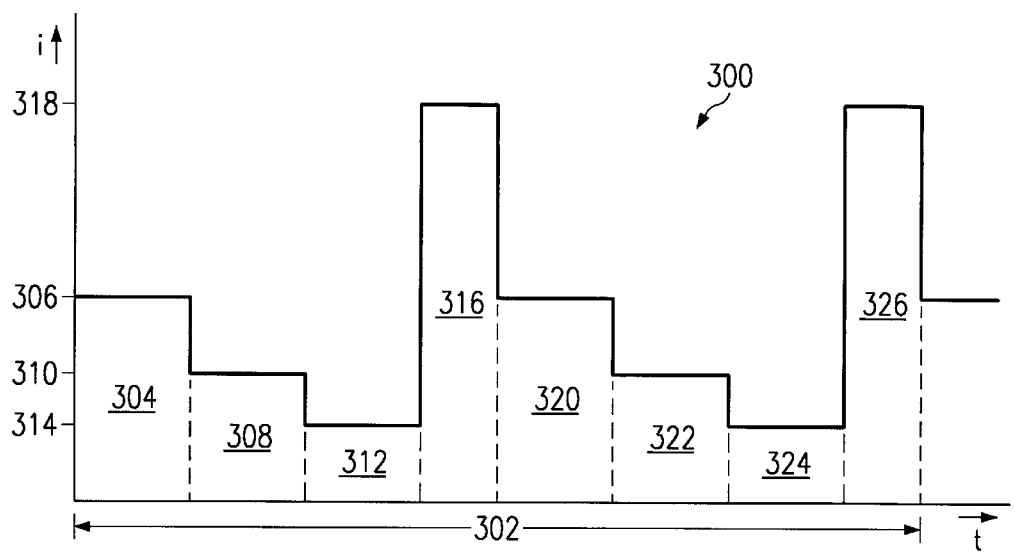
FIG. 3 is a plot of the intensity of light received by a modulator in a single modulator display system such as that shown in FIG. 2.

FIG. 3 is a plot of the intensity of light received by a modulator in a single modulator display system such as the system of FIG. 2. In FIG. 3, the x-axis represents time while the y-axis represents intensity. The waveform shown in FIG. 3 shows the intensity over a period slightly longer than one image frame period. The color wheel generating the waveform 300 of FIG. 3 has four segments and rotates two complete revolutions each frame period 302.

A first portion 304 of the frame period 302 occurs during a green filter segment and produces a primary colored light beam having an intensity level of 306. A second portion 308 of the frame period 302 occurs during a blue filter segment and produces a primary colored light beam having an intensity level of 310. A third portion 312 of the frame period 302 occurs during a red filter segment and produces a primary colored light beam having an intensity level of 314. A fourth portion 316 of the frame period 302 occurs during a clear filter segment and produces a white light beam having an intensity level of 318. The sequence repeats during the second revolution of the color wheel with another green 320, blue 322. red 324, and white 316 period. The intensities, sequences, and periods shown in FIG. 3 are merely illustrative and are not intended to represent actual color sequences or the relative intensities of any particular display system.

As seen by the waveform 300 of FIG. 3, a modulator in a sequential color display system sees a wide range of light intensity levels. As discussed above, a modulator in a parallel color display system sees a relatively constant light intensity level. The present invention uses this realization to enable the spatial light modulator to distinguish between parallel color display systems, which typically have very stringent modulator performance requirements, and sequential color display system, which typically have much less stringent modulator performance requirements. This is accomplished by sensing the light level and detecting whether or not the light level varies a give amount within a predetermined time period.

Methods of detecting the level of light incident on a modulator are well known. U.S. Pat. No. 5,179,274 issued Jan. 12, 1993 and entitled Method For Controlling Operation Of Optical Systems And Devices, and U.S. Pat. No. 5,481,118 issued Jan. 2, 1996 and entitled On-Chip Light Sensor both teach methods of detecting the light level and are incorporated by reference herein. Each of these methods uses the photo-electric response of a circuit element or the silicon substrate to produce a signal indicative of the intensity of light incident the modulator. These methods have typically taught comparing a signal representing the incident light level with a predetermined threshold signal. Depending on the comparison, the modulator is either turned off or allowed to continue operating.

Figure 4:
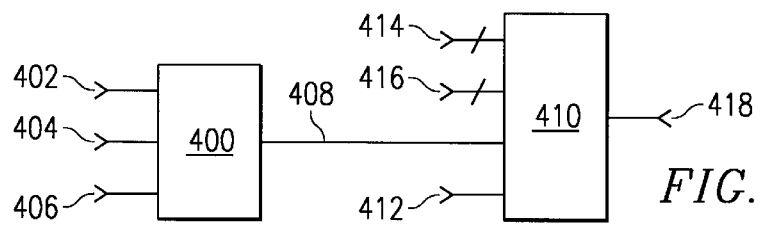
FIG. 4 is a block diagram of the constant light disable system.

FIG. 4 is a block diagram of one embodiment of the constant light disable system. In FIG. 4, a light intensity signal 402 from a light sensor is input to a threshold detect block 400. The signal from the light sensor typically is an analog voltage that is proportional to the incident light intensity. A peak percentage control 404 optionally is included to enable the threshold to be programmable. A threshold disable signal 406 is provided to enable or disable the constant light detection function.

The output of the threshold detect block 400 is an under threshold signal 408 indicating whether the light detected presently is under or over the incident light threshold. The duty cycle detect block 410 determines whether the proportion of time the incident light is under or over the threshold indicates use of the modulator in a constant light or sequential light system. The duty cycle detect block 410 of FIG. 4 uses a periodic signal 412 as a clock to either count up or count down, depending on the status of the under threshold signal 408. A count up step value 414 and a count down step value 416 optionally are used to determine how quickly the duty cycle detection circuit reacts to the incident light. When a predetermined duty cycle is exceeded, the constant light disable function determines improper modulator use and generates a disable signal 418 to disable the modulator array.

Figure 5:
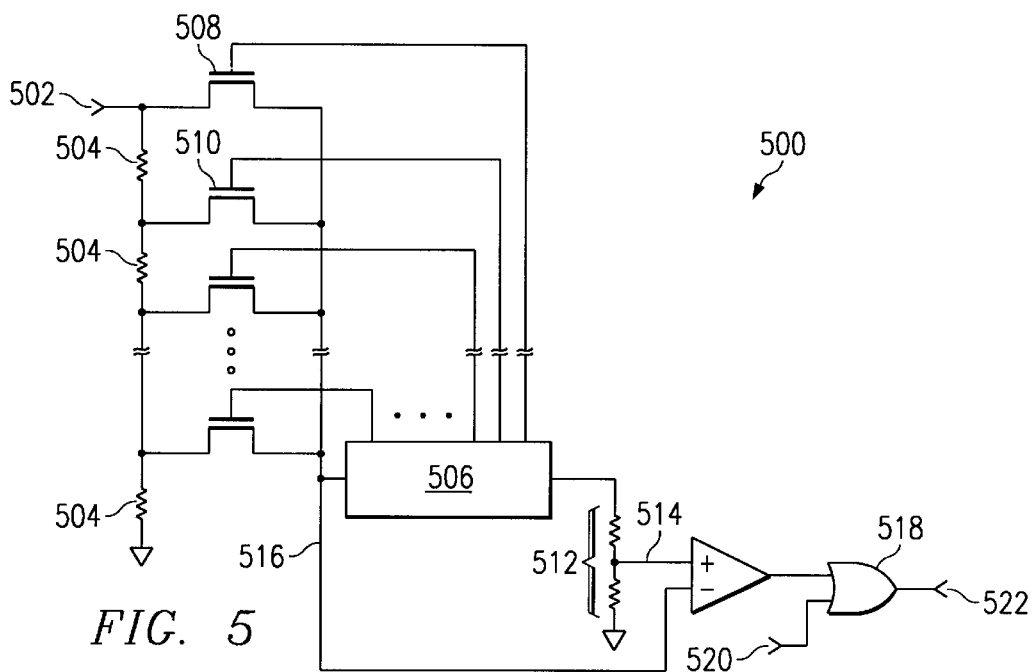
FIG. 5 is a schematic diagram of one embodiment of a threshold detect circuit of the constant light disable system of FIG. 4.

FIG. 5 is a schematic diagram of one embodiment of a threshold detect circuit 500 of FIG. 4. The intensity signal 502 is input to a series of resistors 504 forming a resistive voltage divider network. The intensity signal, or one of the voltages created by the voltage divider network, is passed to a peak detect and gain control block 506. Which voltage is transmitted is determined by the gain control portion of block 506.

Peak detect and gain control block 506 performs a gain control function to ensure the peak detect function is not saturated. When the gain control block 506 turns on transistor 508 the full scale intensity signal 502 is passed to the peak detect and gain control block 506. When another pass transistor, such as pass transistor 510 is turned on, a lesser voltage is transmitted The intensity signal reaching the peak detect and gain control block 506 is latched at its peak and output to a second resistive divider 512. The second resistive divider provides a threshold voltage signal 514 that is a predetermined percentage of the peak voltage 516 held by the peak detect and gain control block 506. Other embodiments of the invention utilize a programmable threshold.

The threshold voltage signal 514 and the scaled input voltage signal 516 are input to a comparator. The comparator produces a high output signal when the scaled input voltage signal 516 falls below the threshold voltage signal 514, and a low output signal when the scaled input voltage signal 516 exceeds the threshold voltage signal 514. This output signal is gated by OR gate 518. OR gate 518 allows the disable signal 520 to trigger an under threshold indication. The circuit of FIG. 5, like the other circuits described herein, can be modified to change the various polarities of methods of determining and comparing signals through many art recognized equivalents without departing from the true scope and nature of the present invention.

The under threshold output signal 522 of FIG. 5 is input to a duty cycle detect circuit 600, one embodiment of which is shown in FIG. 6. The duty cycle detect circuit 600 is used to measure the relative duration of the periods in which the scaled input voltage signal is less than, or greater than, the threshold voltage signal. A counter 602 is used to track the relative durations by counting up when the scaled input voltage exceeds the threshold, and counting down when it does not exceed the threshold. The under threshold output signal 522, which is active high when the scaled input voltage exceeds the threshold, is used to gate a count down factor 604 through AND gate 606.

The count down factor 604 determines how fast adder 608 overflows to produce a carry signal 610. The output of the adder 608 is latched 612 and fed back into the adder 608 so that the current count 614 is incremented by the count down factor 604 each time the under threshold output signal 522 is active when the circuit is clocked. The adder 608 overflows, the carry signal 610 is active on the count down input of counter 602, and counter 602 is decremented when the circuit is clocked.

Similar circuitry produces an up input signal 618 to cause counter 602 to increment when a second adder 620 overflows. The other circuitry increments the second adder 620 by an up scale factor 622 each time the under threshold output signal 522 is not active.

The clock signal 616 for the duty cycle detection circuit 600 shown in FIG. 6 can be any periodic signal. A particular row address signal typically is used for the clock signal 616. Many different periodic signals may be used. The clock signal 616 should be active to clock the duty cycle detection circuit at least once during each color filter period in a sequential color display system. Typically the clock signal 616 is active several times each color filter period. In general, the more times the clock signal 616 is active during each color filter period, the larger the counters need to be since they will be incremented more often.

The up scale factor 622 and down scale factor 604 are selected to enable the counter 602 to count to its up or down limit, as required, during a given period. The period selected is long enough to detect the waveform generated by the sequential color systems, typically an entire frame period or a multiple thereof. Alternate embodiments increment or decrement counter 602 directly, using any reasonable step size, depending on the under threshold voltage signal 522 rather than waiting for a carry to occur in counters 608 or 620.

Counter 602 does not overflow when it reaches either its up or down limit. When the upper limit is reached, the ANDed output signals produce a disable signal 624. The disable signal prevents normal operation of the modulator, typically by stopping the modulator from receiving additional data.

The duty cycle detect circuit 600 of FIG. 6 is designed to disable the modulator when the modulator is operated a predetermined number of clock periods while the incident light intensity level is above the threshold, without being operated a significant number of periods when this condition is not met. In other words, the duty cycle detection circuit disables the modulator unless the incident light level fluctuates enough to indicate the modulator is installed in a sequential color display system. If the measured incident light level is stable enough to indicate operation in a parallel color display system, the modulator is shut down.

FIG. 7 is a schematic diagram of another embodiment of a duty cycle detection circuit of the constant light disable system of FIG. 4. In FIG. 7, the first counter, comprised of adder 620 and latch 626 of FIG. 6, and the second counter, comprised of adder 608 and latch 612 of FIG. 6, are not used. The under threshold signal 522 is used directly to control whether counter 702 increments or decrements. As before, the disable signal 624 is generated when the counter 702 reaches a predetermined value. As in other embodiments, the disable signal 624 may be generated when the counter 702 overflows. The duty cycle detection circuit 700 of FIG. 7 includes a reset signal 704 to put the counter 702 in a known state. Some embodiments reset the counter on power-up. Other embodiments additionally reset the counter at periodic intervals such as each frame period.

FIG. 8 is a schematic diagram of another embodiment of a duty cycle detection circuit of the constant light disable system of FIG. 4. The duty cycle detection circuitry of FIG. 8 is similar to the circuit of FIG. 7. In FIG. 8, the under threshold signal 522 controls whether counter 802 increments or decrements. As before, the disable signal 624 is generated when the counter 802 reaches a predetermined value. As in other embodiments, the disable signal 624 may be generated when the counter 802 overflows. The duty cycle detection circuit 800 of FIG. 8 includes a load signal 804 to put the counter 802 in a known state. When the load signal 804 is active, a predetermined number is loaded into the counter. The load feature provides additional control over how many counts of a given direction are required to disable the modulator. In some embodiments, the load feature may eliminate the need to count in one of the two directions. The counter typically is loaded once each frame period at the beginning of the frame period, or at some other convenient rate.

Comparing the duty cycle detection circuit 800 of FIG. 8 with the duty cycle detection circuit 700 of FIG. 7 shows that the two embodiments count in opposite directions for a given polarity of the under threshold signal 522. Various embodiments of the duty cycle detection circuit may be designed to increment the counter in either direction without preference as long as appropriate count values are selected to disable the modulator. The choice of which way to count for a given threshold condition in any of the embodiments described herein is left to the circuit designer.

FIG. 9 is a schematic diagram of another embodiment of a duty cycle detection circuit 900 of the constant light disable system of FIG. 4. In FIG. 9, counter 902 only counts in one direction and is incremented each clock 616 that the under threshold signal 522 is a first polarity. The counter is reset each time the under threshold signal is a second polarity. When the counter 902 reaches a predetermined value, which equals the number of clock 616 periods without a change in the under threshold signal, disable output signal 624 is active.

FIG. 10 is a schematic diagram of yet another embodiment of a duty cycle detection circuit 1000 of the constant light disable system of FIG. 4. As in FIG. 9, counter 1002 of FIG. 10 only counts in one direction and is incremented each clock 616 that the under threshold signal 522 is a first polarity, and is reset each time the under threshold signal is a second polarity. When the counter 1002 a carry out output of the counter is used as the disable signal 624. As in FIG. 9, when the counter is incremented a given number of times without being reset, an improper use condition is indicated and the disable signal 624 is active.

One application of the duty cycle detection circuit of FIG. 10 counts the number of consecutive times a given row is loaded while the light incident the modulator array exceeds the threshold value. Using a particular row address signal as the clock 616 and assuming the under threshold signal 522 is logic true when the incident light exceeds the threshold, the counter 1002 will count up each time the particular row of the modulator array is loaded. When the incident light does not exceed the threshold, the under threshold signal 522 is logic false and the counter 1002 is reset.

Assuming that a sequential color display system uses four color segments, e.g. red, blue, green, and white, and assuming the incident light falls below the threshold during only one of the four color periods, the counter 1002 will be incremented for three full color periods before being reset. If a given line of the modulator array is loaded eighty times during each color period, the counter will count to 240 before being reset. Using an 8-bit counter prevents the disable signal from being generated during a frame in which the modulator array is installed in a sequential color display system, while generating a disable signal after the row is loaded 256 times. A smaller counter may be used when the light is sure to fall below the threshold during more than one color period, and when the selected row of modulator elements is loaded less than 80 times each frame period.

FIG. 11 is a plan view of a modulator array. In FIG. 11, a central region 1102 of the modulator contains an array of light modulator elements. A photosensitive circuit 1104 is fabricated around the active region 1102 of the modulator to detect light incident on the modulator array. The photosensitive circuit 1104 may be fabricated within or beneath the active region 1102 provided there is enough room. A threshold detection circuit 1106 and a duty cycle detection circuit 1108 also are fabricated on the modulator.

Alternate embodiments disable the modulator if the light level does not fall below the threshold over a predetermined period—in the case where a sequential color modulator is used in a parallel color display system, or disable the modulator if the light level falls below the threshold over a predetermined period—in the case where a parallel color modulator is used in a sequential color system. While a simple threshold circuit is much less complex than the previously discussed counter-based duty cycle detection circuit, the duty cycle detection circuit is much less likely to disable the modulator accidentally, as could occur with a power spike in threshold-only systems.

The circuitry described above may be formed in all modulators, whether destined for sequential or parallel color displays, and enabled or disabled using programmable fuses, package level bond-out connections, or other means. All of the embodiments described above are subject to many obvious variations. For example, some embodiments count down instead of counting up and vice versa. Other embodiments invert certain logic signals.

Thus, although there has been disclosed to this point a particular method and system for limiting the operation of a spatial light modulator, it is not intended that such specific references be considered as limitations upon the scope of this invention except insofar as set forth in the following claims. Furthermore, having described the invention in connection with certain specific embodiments thereof, it is to be understood that further modifications may now suggest themselves to those skilled in the art, it is intended to cover all such modifications as fall within the scope of the appended claims. In the following claims, only elements denoted by the words "means for" are intended to be interpreted as means plus function claims under 35 U.S.C. §112, paragraph six.

What is claimed is:

1. A method of operating a spatial light modulator, the method comprising:

determining a peak level of light incident said modulator over a period of time;

setting a threshold level equal to a fraction of said peak level;

monitoring a current level of light incident said modulator;

comparing said current level of light and said threshold level; and disabling said modulator based on said comparison.

2. The method of claim 1, said determining a peak level of light incident said modulator over a period of time comprising:

generating a signal representing said incident light level;

detecting a peak of said signal representing said incident light level.

3. The method of claim 1, said determining a peak level of light incident said modulator over a period of time comprising:

generating a voltage signal representing said incident light level using a photodiode.

4. The method of claim 1, said determining a peak level of light incident said modulator over a period of time comprising:

generating a voltage signal representing said incident light level using a phototransistor.

5. The method of claim 1, said determining a peak level of light incident said modulator over a period of time comprising:

generating a voltage signal representing said incident light level; and scaling said voltage signal.

6. The method of claim 5, said setting a threshold level equal to a fraction of said peak level comprising:

setting said threshold level equal to a fraction of said scaled voltage signal.

7. The method of claim 1, said setting a threshold level equal to a fraction of said peak level comprising:

dividing said peak level using a voltage divider.

8. The method of claim 1, said comparing said current level of light and said threshold level comprising:

generating a voltage signal when said current level is greater than said threshold level.

9. The method of claim 1, said comparing said current level of light and said threshold level comprising:

generating a voltage signal when said current level is less than said threshold value.

10. The method of claim 1, said comparing said current level of light and said threshold level comprising:

generating a voltage signal, a magnitude of which varies with a result of said comparison.

11. The method of claim 1, said comparing said current level of light and said threshold level comprising:

generating a voltage signal indicating whether said current level is less than or greater than said threshold value.

12. The method of claim 1, said disabling said modulator based on said comparison comprising:

disabling said modulator when said comparison shows said current level is below said threshold value for a predetermined period of time.

13. The method of claim 1, said disabling said modulator based on said comparison comprising:

disabling said modulator when said comparison shows said current level is above said threshold value for an entire said period of time.

14. The method of claim 1, said comparing said current level of light and said threshold level comprising:

generating a voltage signal indicating whether said current level is less than or greater than said threshold value; and said disabling said modulator based on said comparison comprising:

disabling said modulator when a duty cycle of said voltage signal falls below a threshold.

15. The method of claim 1, said comparing said current level of light and said threshold level comprising:

generating a voltage signal indicating whether said current level is less than or greater than said threshold value; and said disabling said modulator based on said comparison comprising:

disabling said modulator when a duty cycle of said voltage signal is above a threshold.

16. The method of claim 1, said disabling said modulator based on said comparison comprising:

incrementing a counter when said current level is less than said threshold value.

17. The method of claim 1, said disabling said modulator based on said comparison comprising:

incrementing a counter when said current level is greater than said threshold value.

18. The method of claim 1, said disabling said modulator based on said comparison comprising:

decrementing a counter when said current level is less than said threshold value.

19. The method of claim 1, said disabling said modulator based on said comparison comprising:

decrementing a counter when said current level is greater than said threshold value.

20. The method of claim 1, said disabling said modulator based on said comparison comprising:

adding a first scale factor to a first previous sum value using a first adder when said current level is less than said threshold value;

adding a second scale factor to a second previous sum value using a second adder when said current level is greater than said threshold value;

incrementing a counter upon a carry condition in said first adder;

decrementing said counter upon a carry condition in said second adder; and disabling said modulator when said counter reaches a limit.

21. The method of claim 1, said disabling said modulator based on said comparison comprising:

adding a first scale factor to a first previous sum value using a first adder when said current level is less than said threshold value;

adding a second scale factor to a second previous sum value using a second adder when said current level is greater than said threshold value;

decrementing a counter upon a carry condition in said first adder;

incrementing said counter upon a carry condition in said second adder; and disabling said modulator when said counter reaches a limit.

22. A modulator array comprising:

a photosensitive circuit for outputting a light intensity signal representative of a level of light incident said photosensitive circuit;

a threshold detection circuit receiving said light intensity signal and outputting an under threshold signal indicative of whether said intensity signal is less than a threshold level; and a duty cycle detection circuit for monitoring said under threshold signal and outputting a disable signal indicative of the duty cycle of said under threshold signal.

23. The modulator array of claim 22, wherein said photosensitive circuit is operable to output an analog signal.

24. The modulator array of claim 22, said threshold detection circuit further comprising a peak detection circuit for determining a peak value of said light intensity signal.

25. The modulator array of claim 22, said threshold detection circuit further comprising:
   a peak detection circuit for determining a peak value of said light intensity signal; and
   a threshold generation circuit for generating a threshold value dependent on said peak value.

26. The modulator array of claim 22, said duty cycle detection circuit further comprising:
   a counter for counting a first direction when said under threshold signal is a first polarity.

27. The modulator array of claim 26, wherein said duty cycle detection circuit generates said disable signal when said counter reaches a predetermined value.

28. The modulator array of claim 26, wherein said counter counts in said first direction in steps greater than one.

29. The modulator array of claim 26, wherein said counter counts in said first direction when said under threshold signal is a first polarity and a periodic signal is active.

30. The modulator array of claim 22, said duty cycle detection circuit further comprising:
   a counter for counting a first direction when said under threshold is logic true and a second direction when said under threshold signal is a second polarity.

31. The modulator array of claim 30, wherein said duty cycle detection circuit generates said disable signal when said counter reaches a predetermined value.

32. The modulator array of claim 31, wherein said counter counts in said first direction in steps greater than one.

33. The modulator array of claim 31, wherein said counter counts in said second direction in steps greater than one.

34. The modulator array of claim 31, wherein said counter counts in said first direction when said under threshold signal is a first polarity and a periodic signal is active.

35. The modulator array of claim 31, wherein said counter counts in said second direction when said under threshold signal is a second polarity and a periodic signal is active.

36. The modulator array of claim 22, said duty cycle detection circuit further comprising:
   a first counter for counting when said under threshold signal is a first polarity;
   a second counter for counting when said under threshold signal is a second polarity; and
   a third counter for counting in a first direction when said first counter reaches a first number and counting in a second direction when said second counter reaches a second number, said disable signal generated when said third counter reaches a third number.

37. The modulator array of claim 36, said first counter comprising:
   a latch for holding a sum; and
   an adder for adding a first number to an output of said latch to generate said sum.

38. The modulator array of claim 37, wherein said adder generates a carry signal and said third counter counting in said first direction when said adder generates said carry signal.

39. The modulator array of claim 36, said second counter comprising:
   a latch for holding a sum; and
   an adder for adding a second number to an output of said latch to generate said sum.

40. The modulator array of claim 39, wherein said adder generates a carry signal and said third counter counts in said second direction when said adder generates said carry signal.

41. The modulator array of claim 36, wherein said first, second, and third counters count when a periodic signal is active.

42. The modulator array of claim 36, wherein said first, second, and third counters count when a particular row decode signal is active.

43. The modulator array of claim 22, said duty cycle detection circuit further comprising:
   a counter for counting a first direction when said under threshold signal is a first polarity and resetting when said under threshold signal is a second polarity.

44. The modulator array of claim 22, comprising:
   a means of enabling or disabling said duty cycle detection circuit.

45. The modulator array of claim 22, comprising:
   a fuse to disable said duty cycle detection circuit.

46. The modulator array of claim 22, wherein said duty cycle detection circuit is enabled or disabled by the package bond-out.

47. The modulator array of claim 22, comprising:
   a means of enabling or disabling said threshold detection circuit.

48. The modulator array of claim 22, comprising:
   a fuse to disable said threshold detection circuit.

49. The modulator array of claim 22, wherein said threshold detection circuit is enabled or disabled by the package bond-out.

* * * * *